United States Patent
Tsirkin

(10) Patent No.: US 9,672,057 B2
(45) Date of Patent: *Jun. 6, 2017

(54) NOTIFICATION OF TARGET BEFORE ALL GUEST DATA IS COPIED TO TARGET IN LIVE MIGRATION

(71) Applicant: Red Hat Israel, Ltd., Raanana (IL)

(72) Inventor: Michael Tsirkin, Yokneam (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,378

(22) Filed: Aug. 25, 2014

(65) Prior Publication Data
US 2014/0366027 A1   Dec. 11, 2014

Related U.S. Application Data

(63) Continuation of application No. 12/968,819, filed on Dec. 15, 2010, now Pat. No. 8,819,678.

(51) Int. Cl.
| | |
|---|---|
| *G06F 9/455* | (2006.01) |
| *G06F 15/16* | (2006.01) |
| *G06F 9/445* | (2006.01) |
| *G06F 9/48* | (2006.01) |
| *G06F 11/14* | (2006.01) |
| *H04L 29/06* | (2006.01) |

(52) U.S. Cl.
CPC ............ *G06F 9/45558* (2013.01); *G06F 8/60* (2013.01); *G06F 9/445* (2013.01); *G06F 9/44505* (2013.01); *G06F 9/45533* (2013.01); *G06F 9/4856* (2013.01); *G06F 11/1438* (2013.01); *G06F 2009/4557* (2013.01); *G06F 2009/45575* (2013.01); *H04L 29/06* (2013.01)

(58) Field of Classification Search
None
See application file for complete search history.

(56) References Cited

U.S. PATENT DOCUMENTS

| | | | |
|---|---|---|---|
| 8,190,769 B1 | 5/2012 | Shukla et al. | |
| 8,429,647 B2 * | 4/2013 | Zhou | G06F 9/4856 709/220 |
| 8,533,320 B2 | 9/2013 | Tsirkin | |
| 8,819,678 B2 | 8/2014 | Tsirkin | |
| 2008/0163207 A1 | 7/2008 | Reumann | |
| 2009/0157882 A1 | 6/2009 | Kashyap | |

(Continued)

OTHER PUBLICATIONS

Address Resolution Protocol (arp), erg.abdn.ac.uk/~gorry/eg3561/inet-pages/arp.html, Jan. 12, 2005.

(Continued)

*Primary Examiner* — Bing Zhao
(74) *Attorney, Agent, or Firm* — Lowenstein Sandler LLP

(57) ABSTRACT

The sending of an early notification when a guest migrates in a virtual machine system is described. A guest hosted by a computer system is migrating from a source hypervisor to a target hypervisor. During the migration, the source hypervisor stops transmission of outbound packets from the guest. A signal is sent to the target hypervisor after stopping the transmission and before completing migration of the guest. The signal requests that a notification containing network addresses of the guest be sent to network devices associated with the target hypervisor.

17 Claims, 6 Drawing Sheets

(56) References Cited

U.S. PATENT DOCUMENTS

| | | |
|---|---|---|
| 2011/0087774 A1 | 4/2011 | Pope et al. |
| 2011/0142053 A1 | 6/2011 | Van Der Merwe et al. |
| 2011/0302577 A1 | 12/2011 | Reuther et al. |
| 2012/0054367 A1 | 3/2012 | Ramakrishnan et al. |
| 2012/0158887 A1 | 6/2012 | Tsirkin |
| 2012/0159473 A1 | 6/2012 | Tsirkin |

OTHER PUBLICATIONS

Clark et al.; Live Migration of Virtual Machine, NSDI'05, 2nd Symposium on Networked Systems Design & Implementaton, 2005.
Silvera et al.; IP Mobility to Support Live Migration of Virtual Machiens Across Subnets, SYSTOR'09, May 4-6, 2009.
USPTO Office Action for U.S. Appl. No. 12/968,834 mailed Nov. 7, 2012.
USPTO Final Office Action for U.S. Appl. No. 12/968,834 mailed Mar. 22, 2013.
USPTO Notice of Allowance for U.S. Appl. No. 12/968,834 mailed May 13, 2013.
USPTO Office Action for U.S. Appl. No. 12/968,819 mailed Jun. 19, 2013.
USPTO Final Office Action for U.S. Appl. No. 12/968,819 mailed Nov. 19, 2013.
USPTO Notice of Allowance for U.S. Appl. No. 12/968,819 mailed May 28, 2014.

* cited by examiner

NOTIFICATION OF TARGET BEFORE ALL GUEST DATA IS COPIED TO TARGET IN LIVE MIGRATION

RELATED APPLICATION

The present application is a continuation of U.S. patent application Ser. No. 12/968,819, filed Dec. 15, 2010, the entire contents of which are hereby incorporated by reference herein.

TECHNICAL FIELD

Embodiments of the present invention relate to a computer system, and more specifically, to management of network addresses in a virtual machine system.

BACKGROUND

A virtual machine system sometimes consists of multiple physical machines and runs multiple hypervisors on a single machine. Each hypervisor can support multiple virtual machines, with each virtual machine running a guest to perform tasks for a user. From time to time a system administrator may want to move ("migrate") a guest from one hypervisor to another for maintenance or performance reasons. The migration may be a "live migration," which means that the guest can be moved without disconnecting its client or application.

When a guest migrates to a different hypervisor, its network location is considered as changed. A changed network location means that the different hypervisor ("target hypervisor") is now responsible for forwarding packets for the guest. Switching components (also referred to as "network devices") in the network to which the target hypervisor is coupled are notified of the guest's new association with the target hypervisor so that the guest can continue to receive packets after migration.

One current approach is to have the source hypervisor send the guest's network addresses to the target hypervisor. Upon receipt of the network addresses, the target hypervisor sends one or more notification packets to the network devices, notifying the network devices of the guest's network addresses. Thus, when a network device receives a packet destined for any of these addresses, the network device can forward the packet to the target hypervisor, which then relays the packet to the guest. Conventionally, the notification packets are sent from the target hypervisor after the live migration is completed. Thus, some of the inbound packets for the guest that arrive during the migration process may be lost. Further, as it usually takes a while for the target hypervisor to notify the network devices of the guest's network addresses, the guest typically cannot immediately receive packets upon completion of live migration.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for sending early notification during live migration of a guest in a virtual machine system. In one embodiment, a guest hosted by a computer system is migrating from a source hypervisor to a target hypervisor. During the migration, the source hypervisor stops transmission of outbound packets from the guest. A signal is sent to the target hypervisor after stopping the transmission and before completing migration of the guest. The signal requests that a notification containing network addresses of the guest be sent to network devices associated with the target hypervisor.

Embodiments of the present invention enable a target hypervisor to notify its network devices of the guest's network addresses before the live migration is completed. Before the migration is completed, the source hypervisor signals to the target hypervisor, indicating that the target hypervisor can send out a notification to its network devices. In response, the target hypervisor sends out the notifications, informing the network devices of the guest's network addresses. Thus, the network devices can start forwarding packets to the guest before the live migration is completed. With embodiments of the present invention, network load can be spread out more evenly across network components, fewer packets will be lost during live migration, and network services can resume faster in live migration.

Throughout the following description, the term "network device" is used to refer to a hardware device, an emulated device in a hypervisor, or a software device that connects either two machines in a network or a machine to a network. Such device includes a network interface card (NIC), a bridge, a switch, a router, etc. It is understood that other network devices may be included. The term "guest" refers to the software that runs or can run on the hypervisor. The guest may be installed on a disk, loaded into memory, or currently running. A guest may include one or more of the following: a firmware copy in memory, an operating system, additional installed software, a browser, applications running on the browser, etc. The term "virtual machine (VM)" refers to part of a hypervisor that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
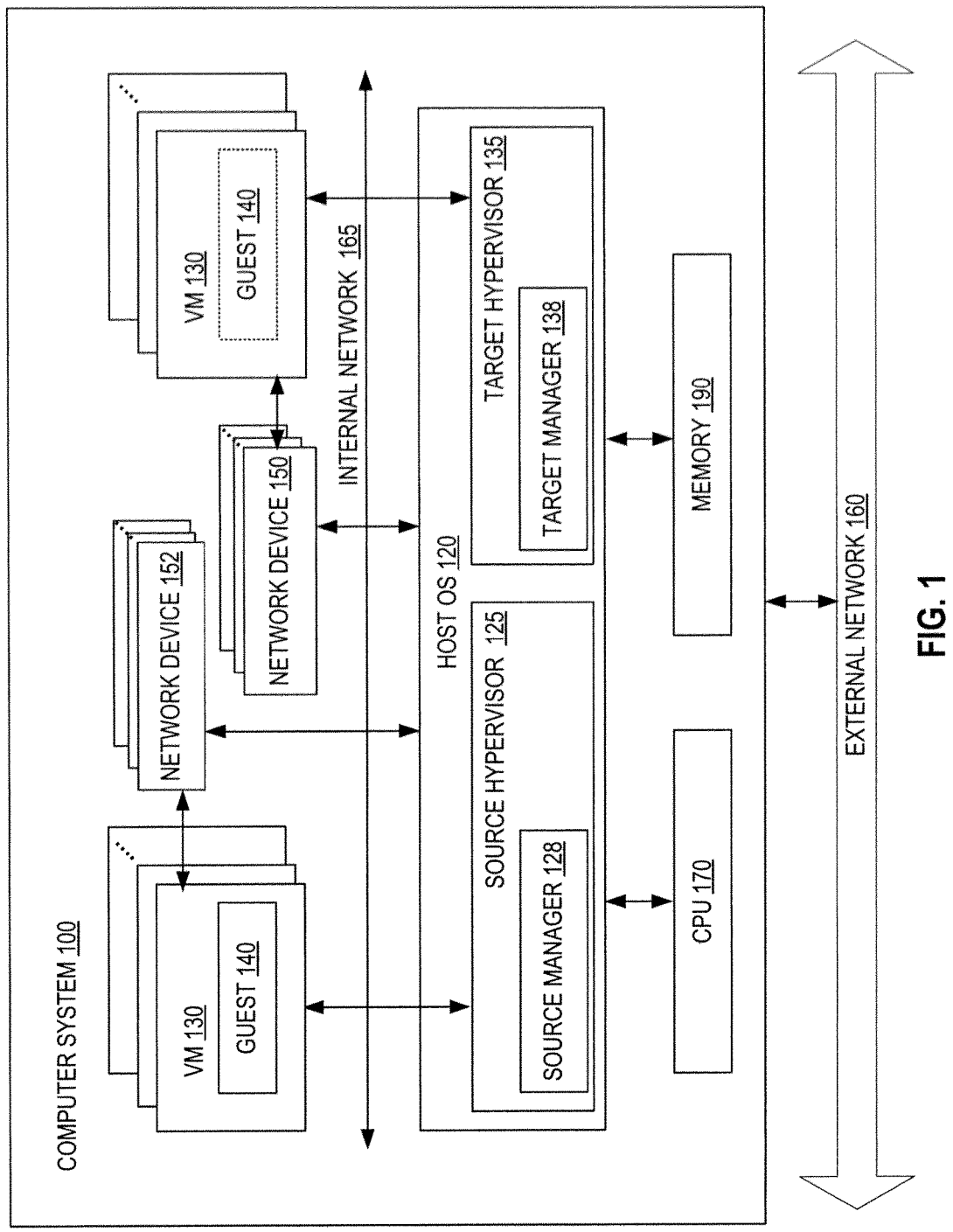
FIG. 1 is a block diagram of a computer system in which a guest migrates from one hypervisor to another hypervisor.

FIG. 1 is a block diagram that illustrates an embodiment of a computer system 100 in which embodiments of the present invention may operate. The computer system 100 hosts a plurality of virtual machines (VM) 130. Each virtual machine 130 runs a guest (e.g., guest 140) that uses a guest operating system to manage its resources. The virtual machines 130 may run the same or different guest operating systems, such as Microsoft Windows®, Linux®, Solaris®, Mac® OS, etc. The computer system 100 may be a server, a workstation, a personal computer (PC), a mobile phone, a palm-sized computing device, a personal digital assistant (PDA), etc.

The computer system 100 also includes hardware components such as one or more physical central processing units (CPUs) 170, memory 190, and other hardware components. The computer system 100 also runs a host OS 120 to manage system resources. In one embodiment, the computer system 100 runs multiple hypervisors 125, 135 (only two are shown) to virtualize access to the underlying host hardware, making the use of the virtual machine 130 transparent to the guest 140 and the users of the computer system 100. In one embodiment, the hypervisors 125 and 135 may be hypervisors in the user space sharing a single hypervisor kernel (not shown). Each of the hypervisors 125 and 135 may support multiple virtual machines 130.

In one embodiment, the computer system 100 is accessible by remote systems via an external network 160. The external network 160 may be a private network (e.g., a local area network (LAN), a wide area network (WAN), intranet, etc.) or a public network (e.g., the Internet). In some embodiments, the computer system 100 may additionally include an optional internal network 165 for facilitating the communication among the virtual machines 130. In one embodiment, the network addresses on the external network 160 and/or the internal network 165 contain physical network addresses, such as Media Access Control (MAC) addresses. A single guest may also be on multiple physical networks and, therefore, may have multiple physical network addresses. Although the MAC address is used throughout the description to represent the physical network address, it is understood that other physical network addresses may be used for different network protocols.

In one embodiment, a guest can also be on one or more virtual networks. For example, the external network 160 and/or the internal network 165 may be a physical LAN that is partitioned into multiple virtual LANs (VLANs) identified by corresponding VLAN tags. A guest on a VLAN can be reached by a network address that contains a (physical network address, VLAN tag) pair. A single guest may be on multiple VLANs that belong to the same physical network, and, therefore, may have multiple network addresses that share the same physical network address (e.g., MAC address) and different VLAN tags.

Thus, each guest in the computer system 100 may be identified by multiple network addresses, such as: physical network addresses (e.g., MAC addresses), virtual network addresses (e.g., (MAC address, VLAN) tag) pairs, a combination of the above, etc.

In one embodiment, one of the guests (e.g., the guest 140) may migrate from one hypervisor (e.g., the source hypervisor 125) to another hypervisor (e.g., the target hypervisor 135) during operation of the computer system 100 (the guest 140 after the migration is shown as a dotted box). The migration may be a "live migration," which means that the guest 140 can be moved without disruption to the users of the virtual machines 130. In one embodiment, the migration changes the association between the guest 140 and the hypervisors 125 and 135, but does not change the network addresses of the guest 140.

In one embodiment, one or more network devices 152 and 150 are coupled to the computer system 100 via the networks 160 and 165. The network devices 152 are used by the source hypervisor 125 and the network devices 150 are used by the target hypervisor 135 to forward packets. Some of the network devices 152 and 150 may coexist on the same physical hardware component. Although not shown in the embodiment of FIG. 1, some of the network devices 152 and 150 may be internal to the computer system 100 and some of them may be external to the computer system 100. Examples of the network devices include switches, bridges, network interface cards (NICs), routers, and any network components that track the transmission of packets on the networks 160 and 165. The network devices may be hardware devices, emulated devices in the source hypervisor 125, software devices, or a combination of the above.

According to one embodiment of the present invention, the target hypervisor 135 includes a target manager 138 to manage the network location of the guests associated with the target hypervisor 135. Similarly, the source hypervisor 125 includes a source manager 128 to manage the network location of the guests associated with the source hypervisor 125. After the guest 140 migrates from the source hypervisor 125 to the target hypervisor 135, network devices 150 need to be informed of the network addresses of the guest 140, as well as the new association between the guest 140 and the target hypervisor 135. Thus, when the network device 150 receives a packet destined for the guest 140, the network device 150 can properly forward the packet to the guest 140 through the target hypervisor 135. In one embodiment, the target hypervisor 135 may notify all of the network devices 150 in the networks 160 and 165 of the guest's network addresses, because the target hypervisor 135 may not know all of the network devices 150 that participate in the packet forwarding chain for the guest 140.

In one embodiment, the target hypervisor 135 receives a list of the guest's network addresses from the source hypervisor 125 during the guest's migration to the target hypervisor 135. After receipt of the guest's network addresses and before completion of the guest's migration, the target hypervisor 135 also receives a signal from the source hypervisor 125 or a management component (e.g., a component in the host controller), indicating that the source hypervisor 125 has stopped forwarding outgoing packets from the guest 140. Upon receiving the signal, the target hypervisor 135 sends a notification to the network devices 150, informing the network devices 150 of the network addresses of the guest 140. Thus, the network devices 150 can start forwarding packets to the guest before the live migration is completed.

Figure 2:
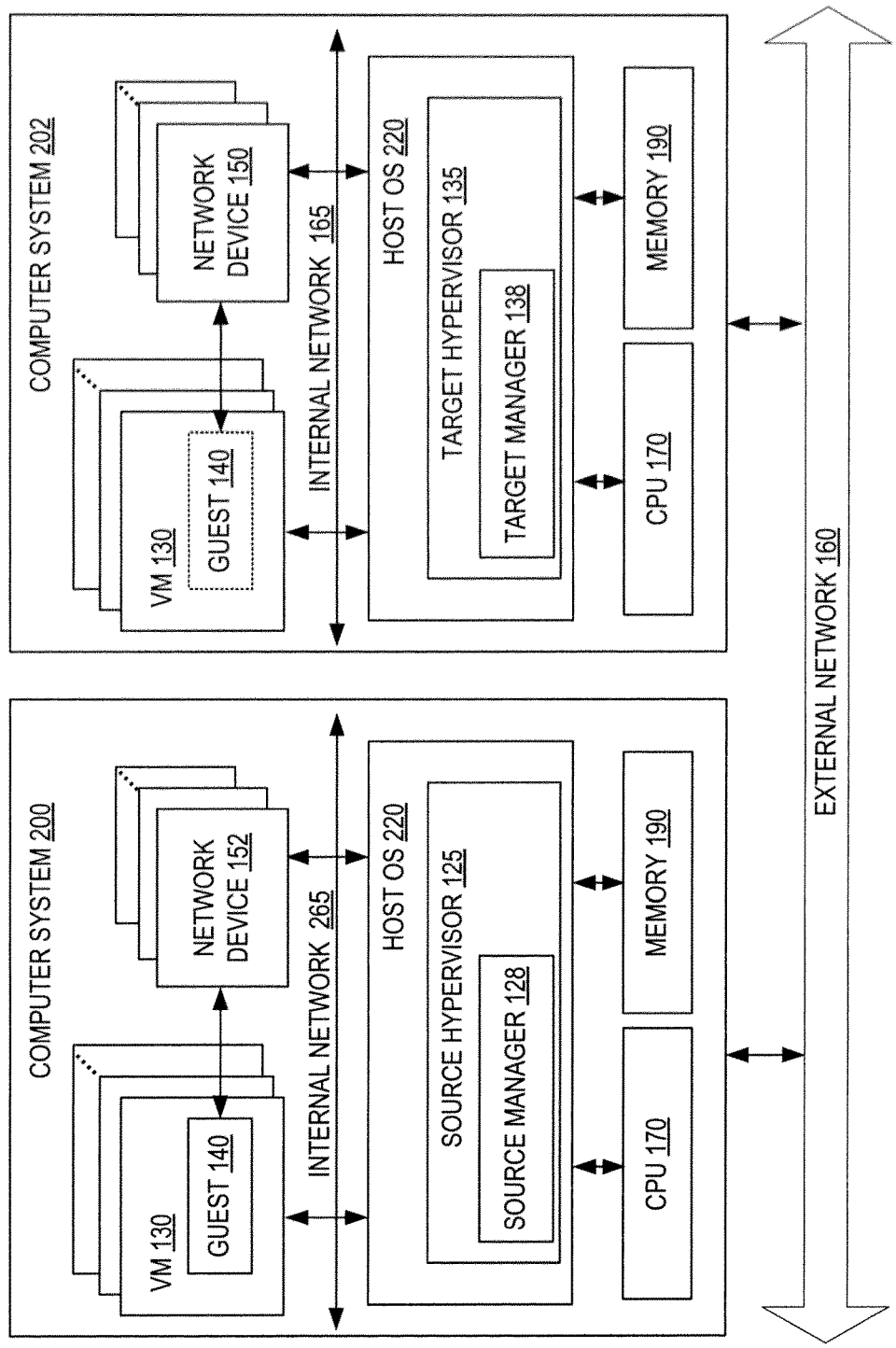
FIG. 2 is a block diagram of two computer systems in which a guest migrates from one computer system to another computer system.

FIG. 2 is a block diagram that illustrates another environment in which embodiments of the present invention may operate. In this environment, the guest 140 can migrate from one computer system 200 to another computer system 202 during operation of the computer systems 200 and 202 without disruption to the users of the virtual machines 130. Similar to the computer system 100, each of the computer systems 200 and 202 may be a server, a workstation, a personal computer (PC), a mobile phone, a palm-sized computing device, a personal digital assistant (PDA), etc. Each of the computer systems 200 and 202 runs a host OS 220 to manage system resources. In one embodiment, the computer systems 200 and 202 may run the same kind or different host operating systems. Each of the virtual machines 130 on the computer systems 200 and 202 may also run the same or different guest operating systems. The computer systems 200 and 202 may also include the same kind or different CPUs 170 and memory 190.

In one embodiment, each of the computer systems 200 and 202 runs one or more hypervisors (only one hypervisor is shown) to virtualize access to the underlying host hardware. When the guest 140 migrates from the computer system 200 to the computer system 202 during operating of the computer systems 200 and 202, the guest 140 becomes disassociated from the source hypervisor 125 and associated with the target hypervisor 135 (the guest 140 after the migration is shown as a dotted box). Similar to the embodiment of FIG. 1, the migration changes the association between the guest 140 and the hypervisors 125 and 135 but does not change the network addresses of the guest 140.

In one embodiment, one or more network devices 152 and 150 are coupled to the computer systems 200 and 202, respectively. In the embodiment of FIG. 2, the network devices 152 and 150 are shown to be internal to the computer systems 200 and 202, respectively. In alternative embodiments, one or more of the network devices 152 and 150 may be external to the computer system 200 and 202. The network devices 152 and 150 may include a switch, a bridge, a network interface card (NIC), a router, and any network component that tracks the transmission of packets on the networks 160, as well as networks 265 and 165, respectively. Each of the network devices 152 and 150 may be a hardware device, an emulated device in the source hypervisor 125 and target hypervisor 135, respectively, a software device, or a combination of the above. In the embodiment of FIG. 2, the guest 140 grates from one physical machine to a different physical machine. Nevertheless, the operations of the source hypervisor 125 and target hypervisor 135 of FIG. 2 are the same as those in FIG. 1 with respect to the mechanism and timing of notification to be described in greater detail with reference to FIGS. 3-5.

Figure 3:
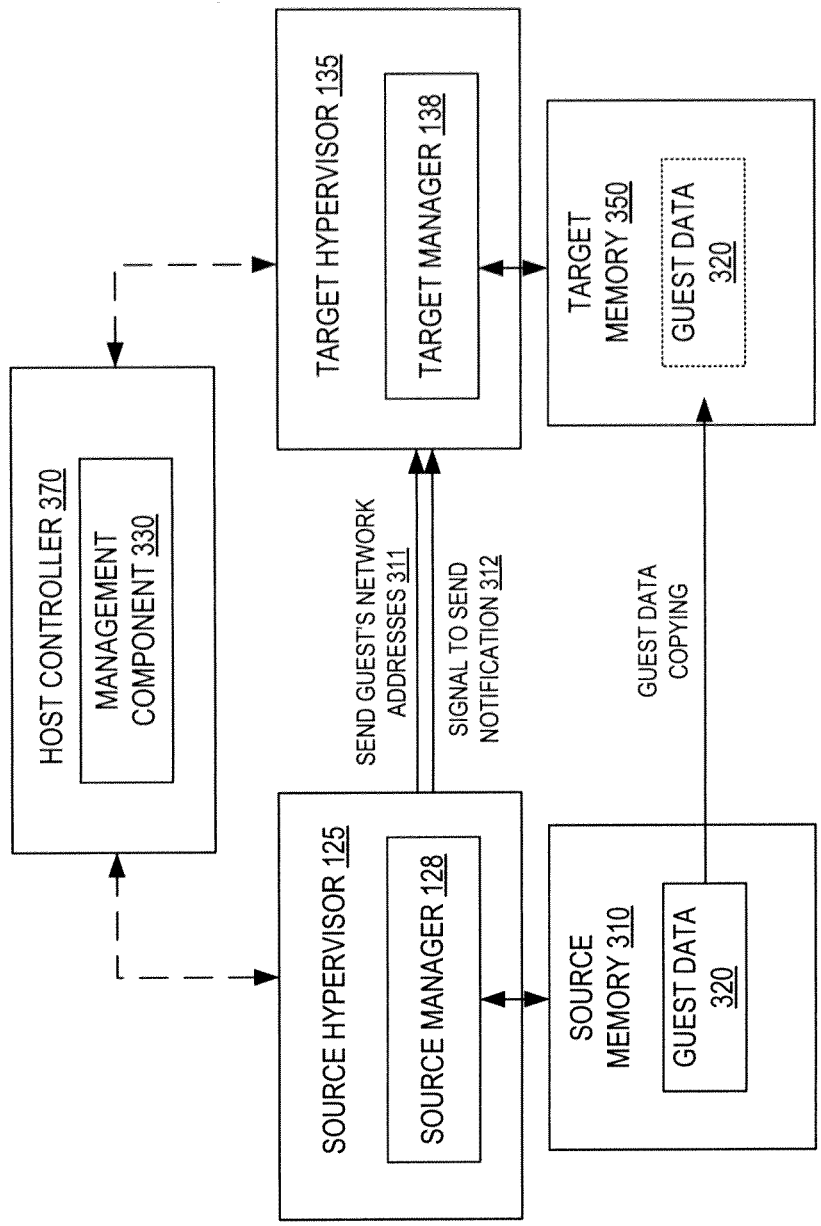
FIG. 3 illustrates an embodiment of a source hypervisor from which a guest migrates, and a target hypervisor to which the guest migrates.

FIG. 3 illustrates an embodiment of the source hypervisor 125 and the target hypervisor 135. The source hypervisor 125 uses the source manager 128 to send the guest's network addresses to the target hypervisor 135 (message 311), and to signal the target hypervisor 135 (message 312) that a notification of the guest's network addresses can be sent to the network devices 150 associated with the target hypervisor 135. The signal can be sent during the copying of guest data 320 from source memory 310 to target memory 350. The source memory 310 is used by the virtual machine associated with the guest at the source side and the target memory 350 is used by the virtual machine associated with the guest at the target side. The target hypervisor 135 then uses the target manager 138 to notify the network devices 150 of the guest's network addresses.

In one embodiment, the signal of message 312 can be sent directly from the source hypervisor 125 to the target hypervisor 135. In an alternative embodiment, the signal of message 312 can be sent from the source hypervisor 125 to the target hypervisor 135 through a management component 330 (the dotted paths through the management component 330 indicate this alternative embodiment). In one embodiment, the management component 330 may be a component within a host controller 370 coupled to the computer system 100 of FIG. 1, or computer systems 200 and 202 of FIG. 2. Alternatively, the management component 330 may be part of the computer system 100 of FIG. 1, or computer systems 200 and 202 of FIG. 2. The management component 330 may operate as directed by a system administrator, a management script or a management application.

In another embodiment, the source hypervisor 125 may send the signal of message 312 in response to a status request. The status request may be made by the target hypervisor 135, or by the management component 330. For example, the target hypervisor 135 and/or the management component 330 can send the status request when a specific part of the guest has already been copied; e.g., when the estimated remaining time to complete migration is below a predefined limit. Additionally or alternatively, the target hypervisor 135 and/or the management component 330 can also keep sending the status requests periodically until a response is received. In one embodiment, the messages 311 and 312 are sent during the copying of the guest data 320 from the source hypervisor 125 to the target hypervisor 135.

Figure 4:
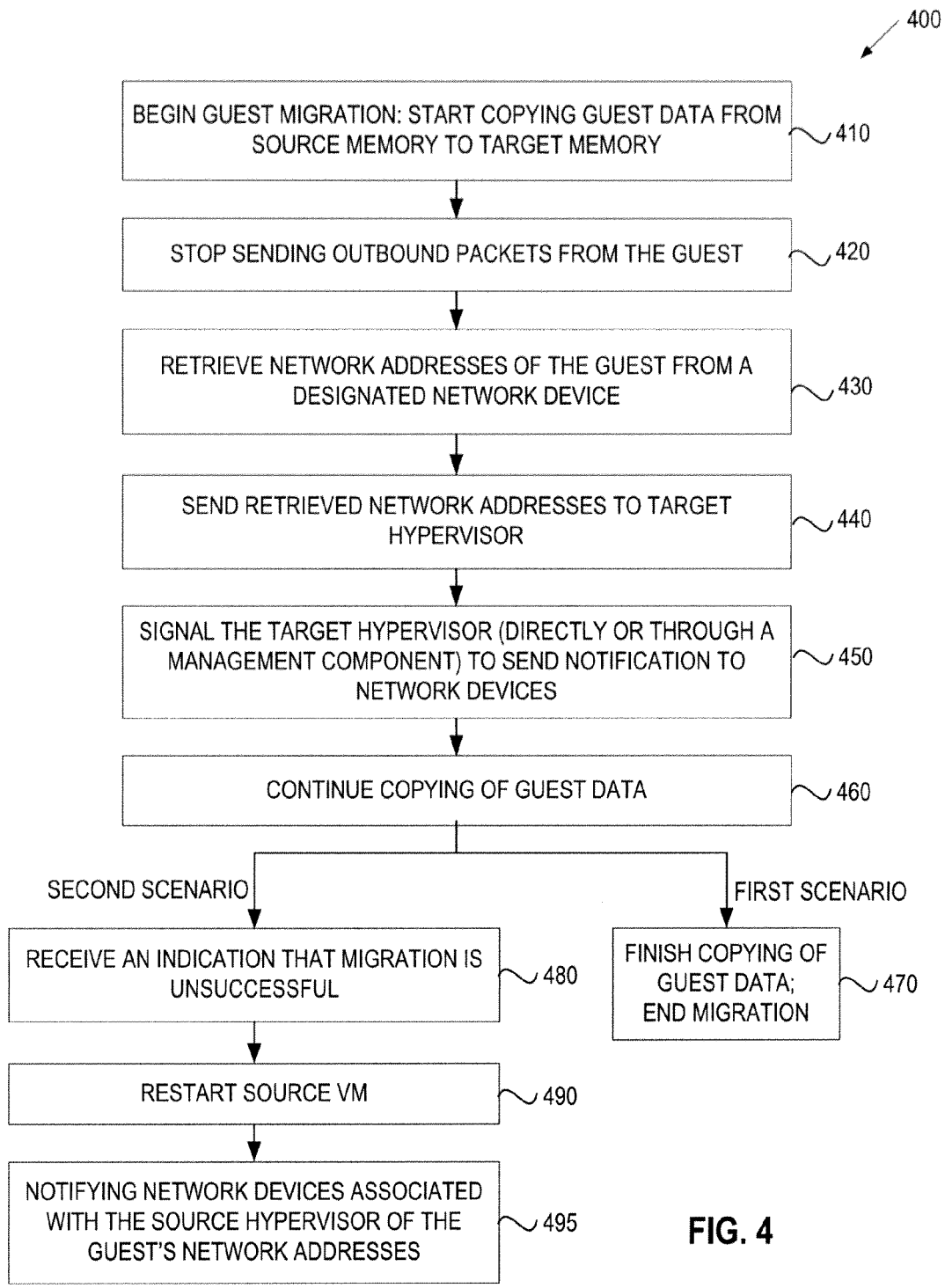
FIG. 4 is a flow diagram of one embodiment of a method for a source hypervisor that signals to a target hypervisor to send early notification.

FIG. 4 is a flow diagram illustrating one embodiment of a method 400 for a source hypervisor to signal a target hypervisor to send early notification to its network devices during a live migration. The method 400 may be performed by a computer system 600 of FIG. 6 that may comprise hardware (e.g., circuitry, dedicated logic, programmable logic, microcode, etc.), software (e.g., instructions run on a processing device), or a combination thereof. In one embodiment, the method 500 is performed by the source manager 128 of the source hypervisor 125 of FIGS. 1-3.

Referring to FIG. 4, in one embodiment, the method 400 begins when the guest migration starts (block 410). The start of the guest migration is indicated by the source hypervisor 125 starting to copy the guest data from a source memory to a target memory (e.g., the source memory 310 and the target memory 350 of FIG. 3). During the process of copying the guest data, the source hypervisor 125 stops sending outbound packets from the guest (block 420). This stoppage can be triggered by a user (e.g., a system administrator), or automatically by the source hypervisor 125 itself when the guest data copying reaches a predefined point. Stopping the transmission of outbound packets from the guest prevents further changes to the guest's network addresses that are tracked by the designated network device associated with the source hypervisor 125. In one embodiment, the stoppage can be achieved by stopping the virtual machine associated with the guest at the source hypervisor 125. At this point, the source hypervisor 125 can continue forwarding inbound packets to the guest. However, the inbound packets will stop arriving at the source hypervisor 125 after the network devices associated with the target hypervisor 135 are informed of the new association between the guest and the target hypervisor 135.

Subsequently, the source hypervisor 125 retrieves the guest's network addresses from the designated network device (block 430), and sends the retrieved addresses to the target hypervisor 135 (block 440). After the network addresses are sent to the target hypervisor 135, the source hypervisor 125 signals the target hypervisor 135 (directly or through the management component 330) to send the network addresses of the guest to network devices associated with the target hypervisor 135 (block 450). The signal may be sent automatically by the source hypervisor 125 following the transmission of the network addresses. Alternatively, the source hypervisor 125 may send the signal in response to a status request that is sent from the management component 330 or the target hypervisor 135 after the transmission of the network addresses. The source hypervisor 125 then continues copying the guest data to the target memory (block 460).

At this point, at least two possible scenarios may occur. In a first scenario, the copying of the guest data continues until all of the copying is finished. The migration then ends (block 470) and the guest is now associated with the target hypervisor 135.

In a second scenario, before the copying is finished and the migration ends (block 470), the source hypervisor 125 receives an indication that the migration is unsuccessful (e.g., fails or s canceled) (block 480). In this scenario, the source hypervisor 125 can restart the virtual machine for the guest at the source side (block 490), and notify the network devices associated with the source hypervisor 125 of the network addresses of the guest (block 495). The notification informs these network devices that the guest is now associated with the source hypervisor 125.

Figure 5:
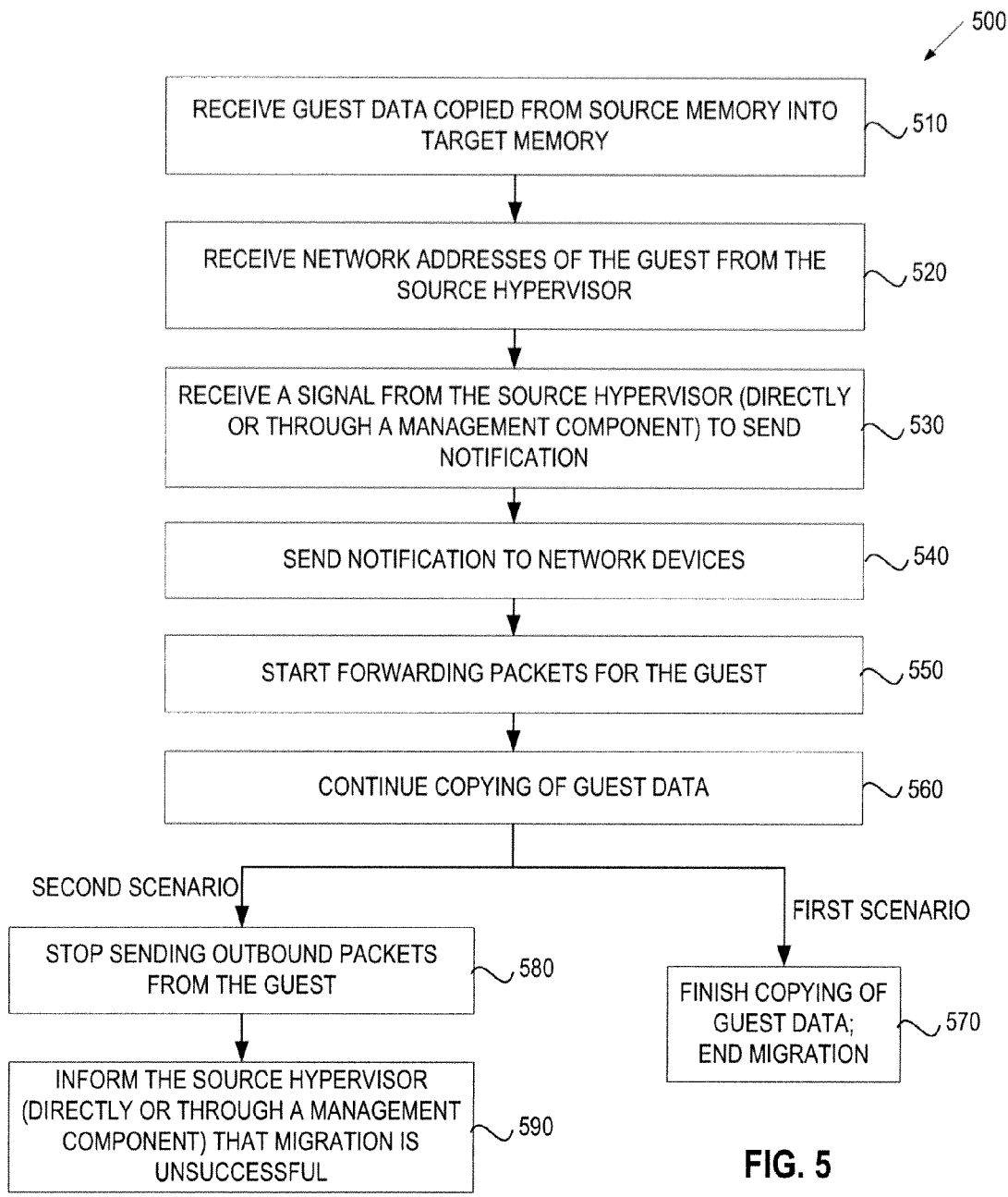
FIG. 5 is a flow diagram of one embodiment of a method for a target hypervisor that sends early notification to network devices.

FIG. 5 is a flow diagram illustrating one embodiment of a method 500 for a target hypervisor to send early notification to its network devices during a live migration. The method 500 may be performed by a computer system 600 of FIG. 6 that may comprise hardware (e.g., circuitry, dedicated logic, programmable logic, microcode, etc.), software (e.g., instructions run on a processing device), or a combination thereof. In one embodiment, the method 500 is performed by the target manager 138 of the target hypervisor 135 of FIGS. 1-3.

Referring to FIG. 5, in one embodiment, the method 500 begins when the target hypervisor 135 receives the guest data copied from the source memory into the target memory (block 510). During the guest data copying, the target hypervisor 135 receives the network addresses of the guest from the source hypervisor 125 (block 520). The receipt of the network addresses follows the stoppage of sending outbound guest packets at the source hypervisor 125. Subsequently, the target hypervisor 135 receives a signal from the source hypervisor 125 (directly or through the management component 330) indicating that the target hypervisor 135 can send a notification to the network devices associated with the target hypervisor 135, informing the network devices of the guest's network addresses (block 530). In one embodiment, the target hypervisor 135 may send a status request to the source hypervisor 125 to trigger the transmission of the signal from the source hypervisor 125. The target hypervisor 135 then notifies the network devices of the guest's network addresses (block 540). After the network devices are notified, the target hypervisor 135 starts forwarding packets for the guest (e.g., receiving inbound packets to the guest and sending outbound packets from the guest) (block 550). The target hypervisor 135 then continue copying of guest data (block 560).

At this point, at least two possible scenarios may occur. In a first scenario, the copying of the guest data continues until all of the copying is finished. The migration then ends (block 570) and the guest is now associated with the target hypervisor 135.

In a second scenario, before the copying is finished and the migration ends (block 570), the migration fails or is canceled (e.g., by a system administrator). In this scenario, the target hypervisor 135 stops sending outbound packets from the guest (block 580). This stoppage can be triggered by a user (e.g., a system administrator), or automatically by the target hypervisor 135 itself upon detection of the unsuccessful migration. In one embodiment, the stoppage can be achieved by stopping the virtual machine associated with the guest at the target hypervisor 135. The target hypervisor 135 then informs the source hypervisor 125 directly or through the management component 330, indicating that the migration is unsuccessful (block 590). As described in the method 400 of FIG. 6, upon receiving the indication of the unsuccessful migration, the source hypervisor 125 restarts the virtual machine for the guest at the source side, and notifies the network devices associated with the source hypervisor 125 of the network addresses of the guest. The notification informs these network devices that the guest is now associated with the source hypervisor 125.

Figure 6:
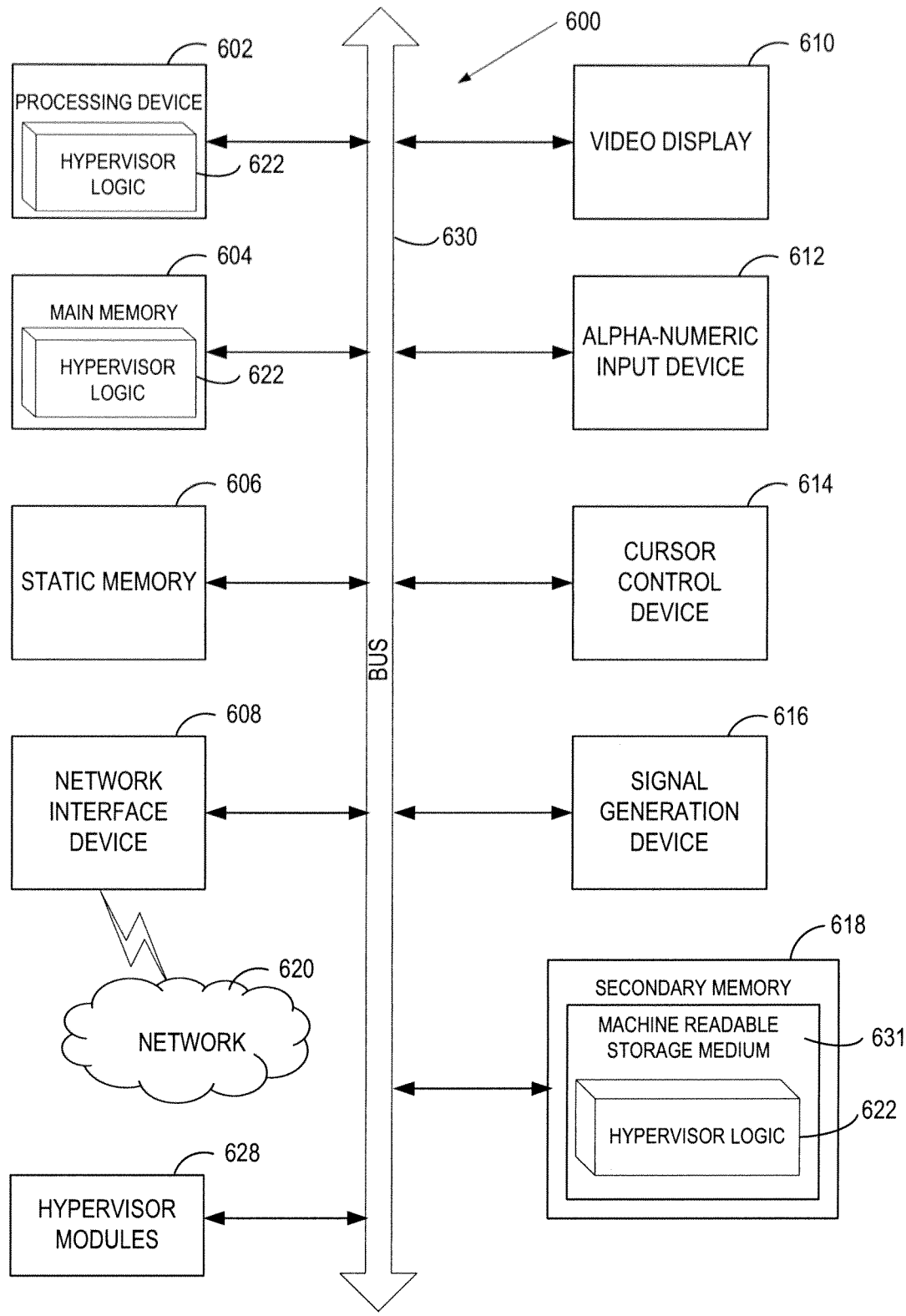
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-serve network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute hypervisor logic 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., hypervisor logic 622) embodying any one or more of the methodologies or functions described herein (e.g., the source hypervisor 125 and/or the target hypervisor 135 of FIGS. 1-3). The hypervisor logic 622 may also reside, completely or at least partially, within the main memory 604 and/or within the processing device 602 during execution thereof by the computer system 600; the main memory 604 and the processing device 602 also constituting machine-readable storage media. The hypervisor logic 622 may further be transmitted or received over a network 620 via the network interface device 608.

The machine-readable storage medium 631 may also be used to store the hypervisor logic 622 persistently. While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 600 may additionally include hypervisor modules 628 for implementing the functionalities of the source hypervisor 125 and/or the target hypervisor 135 of FIGS. 1-3. The module 628, components and other features described herein (for example in relation to FIGS. 1-3) can be implemented as discrete hardware components or integrated in the functionality of hardware components such as ASICS, FPGAs, DSPs or similar devices. In addition, the module 628 can be implemented as firmware or functional circuitry within hardware devices. Further, the module 628 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "stopping", "sending", "receiving", "restarting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   initiating, by a processing device of a source hypervisor, a migration of a guest, wherein the migration comprises copying guest data from the source hypervisor to a target hypervisor, and wherein a network address of the guest does not change as a result of the migration;
   transmitting to the target hypervisor, by the processing device of the source hypervisor, a notification that specifies the network address of the guest and is separate from the guest data copied to the target hypervisor; and
   transmitting to the target hypervisor, by the processing device of the source hypervisor after the notification has been transmitted and before all of the guest data has been copied to the target hypervisor, a signal requesting that the notification be sent to a network device associated with the target hypervisor, wherein the signal is transmitted in response to a status request from the target hypervisor.

2. The method of claim 1, further comprising:
   receiving, by the source hypervisor, an indication that the migration is unsuccessful;
   restarting by the source hypervisor, in response to the indication, a virtual machine for the guest; and
   notifying a network device associated with the source hypervisor of the network address.

3. The method of claim 1, further comprising:
stopping transmission of outbound packets from the guest.

4. The method of claim 3, wherein the stopping transmission comprises stopping a virtual machine associated with the guest.

5. The method of claim 1, wherein the signal originates from the source hypervisor.

6. The method of claim 1, wherein a management component that transmits the signal is directed by at least one of an administrator, a script, or an application.

7. A system comprising:
a network interface device; and
a processing device, operatively coupled to the network interface device, to:
execute a source hypervisor;
initiate a migration of a guest, wherein the migration comprises copying guest data from the source hypervisor to a target hypervisor, and wherein a network address of the guest does not change as a result of the migration;
transmit, to the target hypervisor, a notification that specifies the network address of the guest and is separate from the guest data copied to the target hypervisor; and
transmit, to the target hypervisor after the notification has been transmitted and before all of the guest data has been copied to the target hypervisor, a signal requesting that the notification be sent to a network device associated with the target hypervisor, wherein the signal is transmitted in response to a status request from the target hypervisor.

8. The system of claim 7, wherein the processing device further to:
receive an indication that the migration is unsuccessful;
restart, in response to the indication, a virtual machine for the guest; and
notify a network device associated with the source hypervisor of the network address.

9. The system of claim 7, wherein the processing device further to stop transmission of outbound packets from the guest.

10. The system of claim 9, wherein to stop the transmission, the processing device to stop a virtual machine associated with the guest.

11. The system of claim 7, wherein the signal originates from the source hypervisor.

12. The system of claim 7, wherein a management component that transmits the signal is directed by at least one of an administrator, a script, or an application.

13. A non-transitory computer readable storage medium comprising instructions that, when executed by a processing device of a source hypervisor, cause the processing device to:
initiate, by the processing device of the source hypervisor, a migration of a guest, wherein the migration comprises copying guest data from the source hypervisor to a target hypervisor, and wherein a network address of the guest does not change as a result of the migration; and
transmit to the target hypervisor, by the processing device of the source hypervisor, a notification that specifies a network address of the guest and is separate from the guest data copied to the target hypervisor; and
transmit to the target hypervisor, by the processing device of the source hypervisor after the notification has been transmitted and before all of the guest data has been copied to the target hypervisor, a signal requesting that the notification be sent to a network device associated with the target hypervisor, wherein the signal is transmitted in response to a status request from the target hypervisor.

14. The non-transitory computer readable storage medium of claim 13, wherein the processing device further to:
receive, by the source hypervisor, an indication that the migration is unsuccessful;
restart by the source hypervisor, in response to the indication, a virtual machine for the guest and
notify a network device associated with the source hypervisor of the network address.

15. The non-transitory computer readable storage medium of claim 13, wherein the processing device further to stop transmission of outbound packets from the guest.

16. The non-transitory computer readable storage medium of claim 15, wherein to stop the transmission of outbound packets, the processing device to stop a virtual machine associated with the guest.

17. The non-transitory computer readable storage medium of claim 13, wherein the signal originates from the source hypervisor.

* * * * *